United States Patent [19]

Wieske et al.

[11] 3,949,105

[45] Apr. 6, 1976

[54] MARGARINE FAT

[75] Inventors: Theophil Wieske, Hamburg; Ingo Witte, Hedendorf, both of Germany; Jacob Hannewijk, Vlaardingen, Netherlands; Marcel August Guillaume Willems, Borgerhout-Antwerp, Belgium

[73] Assignee: Lever Brothers Company, New York, N.Y.

[22] Filed: Apr. 28, 1975

[21] Appl. No.: 572,035

Related U.S. Application Data

[63] Continuation of Ser. No. 454,523, March 25, 1974, abandoned.

[52] U.S. Cl. .................. 426/607; 426/603; 426/604
[51] Int. Cl.² ......................................... A23D 3/00
[58] Field of Search .................... 426/607, 603, 604

[56] References Cited
UNITED STATES PATENTS

| | | | |
|---|---|---|---|
| 2,875,066 | 2/1959 | Holman et al. | 426/607 |
| 2,921,855 | 1/1960 | Melnick et al. | 426/603 |
| 2,996,388 | 8/1961 | Lindsay | 426/607 |
| 3,210,197 | 10/1965 | Galenkamp | 426/607 |
| 3,298,837 | 1/1967 | Seiden | 426/607 |
| 3,333,968 | 8/1967 | Bell et al. | 426/601 X |
| 3,595,673 | 7/1971 | Seiden | 426/607 |
| 3,600,195 | 8/1971 | Westenberg | 426/607 |
| 3,634,100 | 1/1972 | Fondu et al. | 426/607 |
| 3,649,295 | 3/1972 | Bernhart | 426/607 X |
| 3,796,581 | 3/1974 | Frommhold | 426/607 X |

*Primary Examiner*—Joseph M. Golian

[57] ABSTRACT

The invention relates to fat blends of a relatively high palm oil content which fat blends are suitable for the preparation of food spreads, particularly margarine, and comprise a co-randomized and a non-randomized part, the co-randomized part comprising a palm-based fat, a lauric fat and a trans-containing fat, the non-randomized part containing such fats that the total fat blend contains well-defined proportions of saturated long-chain fatty acids, mono-trans long-chain fatty acids and saturated short-chain fatty acids. The fat blends of the invention are rapidly crystallizing even when they contain a relatively high proportion of slowly crystallizing palm oil.

8 Claims, No Drawings

MARGARINE FAT

This is a continuation of application Ser. No. 454,523, filed Mar. 25, 1974, and now abandoned.

The present invention relates to fat blends containing palm-based fats, which fat blends are suitable for the preparation of food spreads, particularly margarine and which can also be applied in the production of shortenings.

The invention especially relates to margarine fats from which margarines of such a consistency can be made that they are suitable for packing in tubs.

The invention provides a fat blend suitable for the preparation of emulsions, particularly margarine, having dilatation values at 10°C of at most 1000, at 20°C of at least 200 and at 35°C of no more than 75, which comprises a co-randomized and a non-randomized part, the co-randomized part comprising a palm-based fat, a lauric fat and a trans-containing fat, the non-randomized part containing additional fats such that the fat blend comprises 18–50% H fatty acids, 3–25% T fatty acids 3–30% M fatty acids, while the balance can be made up to L fatty acids. The dilatation values as described in this specification were measured as described in H. A. Boekenoogen "Analysis and Characterization of Oils, Fats and Fat Products", Vol. I 1964, Interscience Publishers, London p.p. 143 et seq.

The term "fat" is used herein to include fatty acid triglycerides which are solid at 20°C and are commonly described as "fats" as well as triglycerides which are liquid at that temperature and which are commonly described as "oils". The term "liquid oil", which is also used in this specification refers to triglycerides which are liquid at 5°C, preferably at 0°C. A "fatty phase" is a fat or fat blend wich can include liquid oils and which is suitable as the sole fat blend in the emulsions of the invention. Similarly a "margarine fat" is a fat blend which can also contain liquid oils and which is suitable as the fatty phase in margarine. Unless stated otherwise, the terms "emulsion", "margarine", "food spread" etc. refer to water-in-fat emulsions containing the fat blends of the invention and also suitable amounts of fat-soluble emulsifiers, e.g. partial fatty acid glycerides like monoglycerides, phosphatides, and fractions thereof, etc. and/or water-soluble emulsifiers, e.g. partial glycerides, phosphatides, egg yolk, protein etc.

In this specification by
- H fatty acids are understood saturated fatty acids with 16–24 carbon atoms
- T fatty acids: mono-trans unsaturated fatty acids with 16–24 carbon atoms
- M fatty acids: saturated fatty acids with 12–14 carbon atoms
- L fatty acids: the remainder, being 100 − (H + T + M)%.

The term "randomizing" refers to the interchange of the fatty acid radicals of the glycerides on the glyceryl radicals in random fashion. This interchange, when applied to at least two different fat sources is called "co-randomizing" and can e.g. be effected under the influence of an interesterification catalyst at temperatures of about 25°–175°C, preferably 80°–140°C. Suitable intersesterification catalysts are alkali metals, their alloys, their hydroxides, their alkoxides, e.g. in proportions of 0.01% to 0.3 or 0.5% by weight of the fat blend to be interesterified.

The fat blend according to the invention is particularly of importance in emulsions containing from 40 or 50 up to 85% of a fatty phase, the balance of the emulsion being an aqueous phase, which can be water, milk or skim milk adjusted to the required pH value e.g. of about 4 or 4.5 to 6 or 7 and which can contain, apart from suitable water-soluble emulsifiers, various minor ingredients e.g. salt, acid, protein, flavours, preservatives, etc.

In this specification all percentages, proportions and parts are by weight unless otherwise specified. The amount of fat in the emulsion is based on the weight of the emulsion, the amount of fat in the fat blend is based on the weight of the fat blend and the amount of fatty acids in a fat is based on the total amount of fatty acids in said fat, unless stated otherwise.

The use of a palm-based fat, which term includes both hydrogenated and unhydrogenated palm oil as well as solid and liquid fractions thereof, preferably as a dominating constituent in margarine fats, is of great importance, for reasons of availability and consistency of such fats and also because of economic considerations.

The presence of substantial amounts of palm-based fats in fat blends to be used in food spreads, e.g. margarines, often results in inadequate products, mainly because palm oil is a slowly crystallizing fat of a very specific glyceride distribution. The slow crystallization properties of palm oil can e.g. result in crystal defects, e.g. caused by "post-hardening", which means that on storage of the prepared product crystal growth proceeds, which e.g. can result in an unacceptable increase in hardness of the product and/or in the formation of large, grain-like crystal aggregates, which in turn are responsible for undesirable organoleptic properties of the finished product.

The fat blend of the present invention can contain substantial proportions of palm-based fat, e.g. from 20, 30, 40 or 50 to about 80% by weight. The fat blends thus obtained are — as compared with the prior art products of the same palm-based fat content — more rapidly crystallizing, probably as a result of interaction of the various types of triglycerides which are formed as a result of co-randomizing part, especially the major proportion, of the fat blend, and they can be used in margarines of outstanding consistency and organoleptic properties. A particular advantage of the fat blends of the invention is that fractionating is an entirely optional process step. If suitable fat fractions are available, they can be incorporated in the fat blend, but if not, it is not necessary and certainly not preferred to carry out a complicated fractionation process, which always has the drawback that substantial proportions of fractions remain for which other outlets have to be found.

A further advantage is that in the fat blends of the invention liquid oils should not be subjected to a co-randomizing treatment, which process when applied to liquid oils may sometimes affect the organoleptic quality of the blend.

Preferably the fat blends of the invention contain a total of T and M fatty acids of 10–45% by weight, particularly 12–40%, the total of H and T fatty acids being preferably at most 60%. The co-randomized part of the fat blend may constitute from 10 or 20 to 80 or 95%, preferably from 35 to 85% by weight of the total blend.

Preferably a co-randomized part is used containing from 5 to 35% by weight of lauric fats, 10 to 50%, especially 15–45% by weight of palm-based fat and 10 to 50% by weight of trans-containing fats based on the total weight of the fat blend to provide from 10 to 40% H, 4 to 25% T and 5 to 25% M fatty acids in the co-randomized part. In a particularly preferred embodiment of the invention the palm-based fats are the dominating fats in the co-randomized part. By "lauric fats" are understood fats containing substantial proportions of glycerides of lauric acid (M acid), particularly coconut oil, palm kernel oil, and babasu oil, which fats may have been subjected to hydrogenation.

The non-randomized part of the fat blend of the invention should be at least 5 or 7% by weight and preferably contains 0 to 25% of lauric fats, 0 to 50% liquid oils, 0 to 25% palm-based fats and 0 to 35% of trans-containing fats. Especially proportions of at least 10 or 20% liquid oils in the non-randomized part provide suitable refrigeration type margarines.

Both in the randomized and the non-randomized part of the fat blend of the invention the palm-based fats can consist of or contain substantial proportions of hydrogenated palm oil, particularly hydrogenated palm oil of a melting point of 40° to 48°C, as well as fractions, particularly the liquid fractions, of hydrogenated or unhydrogenated palm oil obtained by dry fractionating or fractionating in the presence of organic solvents or detergent solutions. Unhydrogenated palm oil is generally preferred since thereby a complicating hydrogenating step can be avoided, without detrimentally affecting the ultimate quality of the fat blend of the invention.

The trans-containing fats can be present in both the randomized and the non-randomized part of the fat blend and hydrogenated oils of a melting point of 25°–55°C, particularly hydrogenated liquid oils of a melting point between 30° and 45°C are preferred.

Suitably the high trans-containing fats are prepared by hydrogenating liquid oils in a conventional iso-promoting way to semi-solid fats having a melting point e.g. between 30° and 45°C and generally having steep temperature/dilatation curves. Such fats generally have relatively few saturated fatty acids, particularly at most 35% and have a trans-fatty acid content of at least 20%, preferably at least 30 or 40%. The preferred range of the trans-fatty acid content of such hydrogenated oils is 50 to 70% and that of the saturated fatty acid content about 15 to 35%. Preferably an iso-promoting sulphur-poisoned hydrogenation catalyst is used in the hydrogenation of such oils, for example 1.5% of a sulphur-poisoned nickel catalyst precipitated on kieselguhr and the hydrogenation can be effected at temperatures varying from about 140°C to 180°C. In this way it is possible to obtain hydrogenated high trans-containing fats containing 40, 45 or 50 to 65, 70 or even 75% of trans-acids and no more than 10 or 15 to 25 or 30% of saturated fatty acids.

The hydrogenation treatment can also be carried out with non-poisoned nickel catalyst precipitated on kieselguhr. These catatlysts are especially used with oils, e.g. certain types of soya bean oil which do not remain stable as regards flavour after a treatment with an iso-promoting catalyst. Such oils therefore are preferably hydrogenated with a fresh nickel catalyst in two or more stages, or in the first stage with a fresh and the second stage with a sulphur-poisoned catalyst, first at about 90° to 120°C and subsequently at about 170°–190°C. With these catalysts also high trans-fatty acid contents can be obtained, e.g. of 30, 35 or 40% up to 55 to 65% by weight and also low saturated fatty acid contents, e.g. no more than 15, 20 or 25 to 30 or 35% by weight based on the total amount of fatty acids in the hydrogenated fats.

Fractions of hydrogenated oils can also be used to provide a suitable trans-containing fat for the fat blend of the invention. The fractionation treatment can be carried out by removing part of the tri-saturated glycerides and thus increasing the proportion of trans-acids, until a fraction of a high trans-acid content is obtained.

With a given trans-content of the trans-containing fats the total proportion of trans-containing fat in the fat blend of the invention is preferably adjusted to provide a fat blend of a trans-fatty acid content of 3 to 25%, particularly 3 to 25% in the co-randomized part, calculated on the total blend.

Fractionation of the hydrogenated fat and/or the palm-based fat to be used in the fat blend of the invention, is preferably carried out by heating the fat to a temperature of about 50° or 60°C, cooling the liquid fat obtained to 40°C, followed by a gradual cooling in about 4 hours to about 32° to 38°C in the case of hydrogenated fats or 15° to 35°C in the case of a palm-based fat. The mass obtained is subsequently kept at this temperature for a period of about 1.5 to 3 hours, after which the solid fraction is separated, e.g. by filtration.

Oils which are suitable for the preparation of trans-containing fats are for instance groundnut, rapeseed, sunfower, safflower, soyabean, fish and cottonseed oil.

The melting point referred to above is the "slip melting point" as defined in Bailey "Melting and Solidification of Fats", Interscience Publishers Incorporated, New York, 1950, p. 110.

The liquid oil component to be used in the fat blend of the invention is preferably one containing at least 40% by weight of poly-unsaturated fatty acids, for example sunflower, safflower, cottonseed, wheat germ, soybean, grapeseed, poppyseed, tobaccoseed, rye, walnut or corn oil.

According to a specific embodiment of the invention, margarine fats are provided which are suitable for refrigerator-type margarines, i.e. those which are preferably packed in tubs, having dilatation values at 10°C of no more than 700 and at 35°C of no more than 50, ; said margarine fats comprising about 45 to 70% by weight of co-randomized constituents, the remainder being non-randomized constituents, the co-randomized part comprising 20–45% unhydrogenated palm oil, 5 to 30% of lauric fats, the balance being hydrogenated trans-containing fats.

The margarines can be prepared by emulsifying the suitable aqueous phase in a suitable proportion in the fat blend of the invention and chilling and working the mass in a conventional manner. The aqueous phase can contain additives which are customary for margarine, for example emulsifying agents, salt and flavours. Oil-soluble additives e.g. flavouring compounds, vitamins etc. can be included in the fatty phase. Generally the proportion of fatty phase in a margarine varies from about 75 to 85% of the emulsion depending on local statutory requirements for margarine. Alternatively higher proportions of the aqueous phase can be adopted in the production of so-called low-fat spreads, which can contain as little as 35, 40 or 50 up to 60% by weight of fat.

The emulsions, particularly the margarine, can be manufactured in a conventional closed tubular surface-scraped exchanger as described in "Margarine" by A.J.C. Andersen and P. N. Williams, Pergamon Press 1965, pp. 246 et seq. Votator arrangements described in British patent specification 639,743, British patent specification 650,481 and British patent specification 765,870 are particularly suitable. Alternatively, emulsions can be prepared by means of a phase inversion process as described in British patent specification 1,215,868 or on conventional cooling drums as described in the same book by Andersen and Williams.

The invention will be illustrated by the following examples:

EXAMPLES I–XXII

Fat blends were prepared containing non-randomized and co-randomized constituents.

The fat blends of Examples I-XIX were used for the preparation of margarine, the blend of Example XX for a low calorie spread and the blends of Examples XXI and XXII were used as shortenings.

Margarines were prepared as follows:

The margarine fat blend was melted and emulsified with an aqueous phase prepared from soured milk containing 0.1% monodiglycerides to give an emulsion containing 80% of fat.

The emulsion was crystallized and worked in a closed tubular surface-scraped heat exchanger (Votator A-unit), which was left at a temperature of 15°C. The cooling temperatures in the A-unit were from –6° to –10°C and 40% of the treatment emulsion was recirculated. Thereafter the crystallized emulsion was passed through a resting tube (Votator B-unit), where it crystallized further for 160 sec. and was then liquid-filled into tubs.

The low calorie spread was prepared as follows:

For the preparation of a low calorie spread with good spreadability at refrigerator temperature and a very satisfactory melting behaviour, 4t of the fat blend of Example XVIII were mixed with 4 kg of a high-melting distilled monoglyceride and 12.5 kg of a distilled sunflower oil monoglyceride. The fat phase was mixed and emulsified in a normal votator arrangement using less cooling, with 6t of a water phase containing 1% of salt and sufficient citric acid to maintain a pH in the emulsion of 4.2.

The votated product was tub-filled and possessed the described properties in the fresh state and also after 6 weeks' storage at 15°C.

The shortenings were prepared as follows:

A specially refined, rather white fat composition was continuously fed in the molten state into a tubular heat exchanger, in which the mass quickly crystallized while sufficient nitrogen (about 20 Vol%) was dosed into the solidifying fat stream, most of the gas being dissolved under the pressure in the equipment. After heavy but short mechanical working in a high speed crystallizer under almost normal pressure, the shortening mass was ready for pack-filling. The final stiffening period was less than 1 minute.

The co-randomization was carried out as follows:

The fats to be co-randomized were dried to a water content of about 0.01% by weight and subsequently co-randomized at 110°C in a stirred vessel which was kept under a vacuum of 2 cm mercury, in the presence of 0.1% by weight of sodium methoxide as a catalyst. After 20 minutes the mixture was cooled and the vacuum released. The catalyst was destroyed by washing the co-randomized mixture with water and dried as before.

Preparation of hardened fats

Palm oil, having a melting point of 38°C, was heated in a hydrogenation vessel to 120°C under hydrogen gas. then 0.5% of a sulphurized Ni-on-guhr catalyst was added and the hydrogenation started. After 90 mins. at 180°C hydrogen supply was stopped and the oil was filtered free of catalyst. The hardened palm oil obtained had a melting point of 42°C. a trans-fatty acid content of 30%, and contained 50% H-, 1% M- and 29% L-fatty acids.

Soybean oil was treated in a similar way as described above; however, the initial hydrogenation temperature was held at 140°C for 2 hours before the temperature was allowed to rise to 180°C after addition of 0.2% of fresh Ni-on-guhr catalyst for a further 1.5 hours. After filtration of the catalyst, the hardened bean oil had a melting point of 43°C, and showed the following fatty acid class composition: $T = 55\%$, $H = 30\%$, $M = 0.5\%$ and $L = 14.5\%$.

Rapeseed oil was hydrogenated with 0.3% of nonsulphurized active Ni-catalyst at 190°C until the final iodine value was below 1. The melting point then was 70°C.

20 kg of peruvian fish oil, iodine value 190, was hydrogenated at 145°C in the presence of 0.5% of fresh Ni-on-guhr catalyst, said catalyst containing 60% of Ni on dry weight. After 90 minutes the iodine value had dropped to 150 and the temperature was then allowed to rise to 180°–185°C for a further 120 minutes. After that period the hydrogen gas supply was stopped and the oil filtered after cooling to 85°C under an atmosphere of carbon dioxide. The final iodine value of the hardened fish oil was 70, and the m.p. 41°C. The fatty acid composition of the oil was $T = 40\%$, $H = 40.5\%$ and $M = 8\%$.

Neutralized and bleached soybean oil, I.V. 132.8, was subjected to a first hydrogenation step at 105°C using 0.1% Ni based on oil as a fresh, nonsulphurized Ni-on-guhr catalyst. After reaching of an iodine value of 95 and a m.p. of 28.5°C, the catalyst was filtered off. The fatty acid composition of the oil was $H = 21\%$, $T = 22\%$, $M = 0\%$.

Part of this hydrogenated soybean oil was further hydrogenated at 180°C after addition of 0.4% of a sulphurized Ni-catalyst up to a m.p. of 36°C. After filtration the oil had a fatty acid composition of $H = 22\%$, $T = 56\%$, $M = 0$.

The composition of the fat blends, expressed in proportions of fats and fatty acids, as well as the dilatometric characteristics are compiled in the accompanying table.

| Non-randomized constituents | EXAMPLES | | | | | | | | | | |
|---|---|---|---|---|---|---|---|---|---|---|---|
| | I | II | III | IV | V | VI | VII | VIII | IX | X | XI |
| Sunflower oil | 10 | 20 | 25 | 25 | 15 | 20 | 18 | 15 | 10 | 15 | 10 |
| Soybean oil | 10 | — | — | — | 10 | — | — | — | — | 10 | — |
| Groundnut oil | — | — | — | — | — | — | — | — | — | — | — |
| Cottonseed oil | — | — | — | — | — | — | — | — | — | — | — |
| Coconut oil | 5 | — | 5 | — | 5 | 5 | 7 | 5 | 5 | 10 | — |
| Palm kernel oil | — | 5 | — | — | — | — | — | — | — | — | — |

-continued

EXAMPLES

| Non-randomized constituents | I | II | III | IV | V | VI | VII | VIII | IX | X | XI |
|---|---|---|---|---|---|---|---|---|---|---|---|
| Palm oil | 10 | 15 | 10 | 10 | — | — | — | — | 5 | — | — |
| Hydrogenated soybean oil m.p. 28°C | 10 | — | — | — | — | — | — | — | — | 10 | — |
| Hydrogenated soybean oil m.p. 36°C | — | — | — | — | — | — | — | — | — | 5 | — |
| Hydrogenated palm oil m.p. 42°C | — | — | — | 5 | 5 | — | 5 | — | — | 5 | — |
| Beef tallow | — | — | — | — | — | 5 | — | — | — | — | — |
| Hydrogenated rapeseed oil m.p. 70°C | — | — | — | — | — | — | — | — | — | — | — |
| Fatty acids in non-randomized part in % of total blend | | | | | | | | | | | |
| H | 10.2 | 10.5 | 8.5 | 10.5 | 16.5 | 5.5 | 5.5 | 2.5 | 4.5 | 11.5 | 6.5 |
| T | 2.0 | 0 | 0 | 1.5 | 1.5 | 0 | 1.5 | 0 | 0 | 3.5 | 3 |
| M | 3 | 3 | 3 | 0 | 3 | 3.5 | 4 | 3 | 3 | 6.5 | 0 |

| Non-randomized constituents | XII | XIII | XIV | XV | XVI | XVII | XVIII | XIX | XX | XXI | XXII |
|---|---|---|---|---|---|---|---|---|---|---|---|
| Sunflower oil | 25 | 25 | 30 | 10 | — | 15 | — | 35 | 40 | — | — |
| Soybean oil | — | — | — | 10 | — | 10 | 35 | 15 | — | — | — |
| Groundnut oil | — | — | — | — | — | — | — | — | — | 15 | 20 |
| Cottonseed oil | — | — | — | — | 20 | — | — | — | — | — | — |
| Coconut oil | — | 5 | 5 | 10 | 10 | 10 | — | — | — | — | — |
| Palm kernel oil | 10 | — | — | — | — | — | — | — | — | — | — |
| Palm oil | — | 5 | 5 | — | — | — | — | — | — | — | — |
| Hydrogenated soybean oil m.p. 28°C | 10 | 5 | — | 10 | — | 10 | — | — | — | — | — |
| Hydrogenated soybean oil m.p. 36°C | — | — | — | — | — | — | — | — | — | 5 | — |
| Hydrogenated palm oil m.p. 42°C | — | — | — | — | — | — | — | — | — | — | — |
| Beef tallow | — | — | — | — | — | — | — | — | — | — | — |
| Hydrogenated rapeseed oil m.p. 70°C | — | — | — | — | 0.5 | — | — | — | — | — | — |
| Fatty acids in non-randomized part in % of total blend | | | | | | | | | | | |
| H | 6.5 | 9 | 7 | 6 | 7.5 | 9.5 | 4.5 | 13 | 4.5 | 5.5 | 4 |
| T | 2 | 1 | 0 | 2 | 0 | 1.5 | 0 | 4 | 0 | 1.5 | 0 |
| M | 6 | 3 | 3 | 6.5 | 6.5 | 0 | 0 | 0 | 0 | 0 | 0 |

| I | II | III | IV | V | VI | VII | VIII | IX | X | XI | Co-randomized constituents |
|---|---|---|---|---|---|---|---|---|---|---|---|
| 10 | 15 | 15 | 20 | 15 | 15 | 10 | — | 32 | 10 | 10 | Coconut oil |
| — | — | — | — | — | — | — | 20 | — | — | — | Palm kernel oil |
| 35 | 35 | 35 | 30 | 40 | 40 | 45 | 45 | 16 | 30 | 30 | Palm oil |
| — | — | — | — | — | — | — | — | — | — | — | Hydrogenated fish oil m.p. 41°C |
| — | — | — | — | — | — | — | — | — | 10 | — | Hydrogenated soybean oil m.p. 43°C |
| — | — | — | — | — | — | — | — | 32 | — | — | Hydrogenated palm oil m.p. 42°C |
| 10 | 10 | 10 | 10 | 10 | 15 | 15 | 15 | — | — | 10 | Hydrogenated soybean oil m.p. 36°C |
| — | — | — | — | — | — | — | — | — | — | — | Hydrogenated rapeseed oil m.p. 70°C |
| 55 | 60 | 60 | 60 | 65 | 70 | 70 | 80 | 80 | 50 | 50 | % Co-randomized |
| | | | | | | | | | | | Fatty acids in co-randomized part, calculated in % of total blend |
| 21 | 21.5 | 21.5 | 19.5 | 24 | 25 | 27 | 28.5 | 28.0 | 19 | 18.5 | H |
| 5.5 | 5.5 | 5.5 | 5.5 | 5.5 | 8.5 | 8.5 | 8.5 | 10 | 5.5 | 5.5 | T |
| 6.5 | 10 | 10 | 13 | 10 | 10 | 6.5 | 13 | 21 | 6.5 | 6.5 | M |

| XII | XIII | XIV | XV | XVI | XVII | XVIII | XIX | XX | XXI | XXII | Co-randomized constituents |
|---|---|---|---|---|---|---|---|---|---|---|---|
| 10 | 20 | 15 | 15 | 32 | 10 | 24 | 14 | 24 | 32 | 8 | Coconut oil |
| — | — | — | — | — | — | — | — | — | — | — | Palm kernel oil |
| 35 | 30 | 30 | 30 | 16 | 30 | 24 | 14 | 24 | 32 | 32 | Palm oil |
| — | — | — | — | — | 10 | — | — | — | — | — | Hydrogenated fish oil m.p. 41°C |
| — | — | — | — | — | — | 12 | 8 | 12 | 16 | — | Hydrogenated soybean oil m.p. 43°C |
| — | — | — | — | — | — | — | — | — | — | — | Hydrogenated palm oil m.p. 42°C |
| 10 | 10 | 15 | 15 | 16 | — | — | — | — | — | 40 | Hydrogenated soybean oil m.p. 36°C |
| — | — | — | — | 5.5 | — | — | — | — | — | — | Hydrogenated rapeseed oil m.p. 70°C |
| 55 | 60 | 60 | 60 | 70 | 50 | 60 | 36 | 55 | 80 | 80 | % Co-randomized |
| | | | | | | | | | | | Fatty acids in co-randomized part, calculated in % of total blend |
| 21 | 19.5 | 20 | 20 | 22 | 20 | 19 | 11.5 | 19 | 25 | 25 | H |
| 5.5 | 5.5 | 8.5 | 8.5 | 9 | 4.0 | 7 | 4.5 | 7 | 10 | 23 | T |
| 6.5 | 13 | 10 | 10 | 21 | 6.5 | 15.5 | 9 | 15.5 | 21 | 5 | M |

| Total fat blend | I | II | III | IV | V | VI | VII | VIII | IX | X | XI |
|---|---|---|---|---|---|---|---|---|---|---|---|
| % fatty acids | | | | | | | | | | | |
| H | 31 | 32 | 30 | 30 | 30.5 | 30.5 | 33 | 31 | 32 | 30.5 | 25 |
| T | 7.5 | 5.5 | 5.5 | 7 | 7 | 8.5 | 10 | 8.5 | 10 | 9 | 8.5 |
| M | 9.5 | 13 | 13 | 13 | 13 | 13.5 | 10.5 | 16 | 24 | 13 | 6.5 |
| Dilatation values at 10°C | 640 | 670 | 650 | 690 | 720 | 780 | 800 | 800 | 880 | 620 | 510 |
| 15°C | 475 | 500 | 480 | 500 | 570 | 600 | 605 | 620 | 730 | — | — |
| 20°C | 350 | 360 | 360 | 380 | 420 | 440 | 435 | 460 | 525 | 350 | 230 |
| 25°C | 230 | 240 | 240 | 230 | 280 | 282 | 275 | 280 | 300 | — | — |
| 30°C | 130 | 130 | 120 | 110 | 140 | 140 | 140 | 145 | 145 | 145 | 100 |
| 35°C | 50 | 50 | 40 | 30 | 40 | 35 | 45 | 45 | 30 | 40 | 30 |
| 40°C | | | | | | | | | | | |

| Total fat blend | XII | XIII | XIV | XV | XVI | XVII | XVIII | XIX | XX | XXI | XXII |
|---|---|---|---|---|---|---|---|---|---|---|---|
| % fatty acids | | | | | | | | | | | |

-continued

| Non-randomized constituents | | | I | II | III | EXAMPLES IV | V | VI | VII | VIII | IX | X | XI |
|---|---|---|---|---|---|---|---|---|---|---|---|---|---|
| | H | 27.5 | 28.5 | 27 | 26 | 29.5 | 30 | 23.5 | 24.5 | 23.5 | | 30.5 | 29 |
| | T | 8 | 6.5 | 8.5 | 10.5 | 9 | 5.5 | 7 | -8.5 | 7 | | 11.5 | 23 |
| | M | 12.5 | 16 | 13 | 16.5 | 27.5 | 6.5 | 15.5 | 9 | 15.5 | | 21 | 5 |
| Dilatation valves at 10°C | | | 580 | 630 | 600 | 680 | 790 | 610 | 630 | 580 | 630 | 995 | 965 |
| 15°C | | | — | — | — | — | — | — | — | — | — | 740 | 750 |
| °20°C | | | 330 | 340 | 310 | 345 | 450 | 335 | 350 | 285 | 350 | 590 | 630 |
| 25°C | | | — | — | — | — | — | — | — | — | — | 270 | 320 |
| 30°C | | | 110 | 95 | 105 | 100 | 135 | 135 | 80 | 105 | 80 | 180 | 200 |
| 35°C | | | 35 | 35 | 30 | 25 | 25 | 35 | 20 | 35 | 20 | 60 | 70 |
| 40°C | | | | | | | | | | | | | |

What is claimed is:

1. Fat blend having dilatation values at 10°C to 20°C of at least 200 and at most 1000 and at 35°C of no more than 75 consisting essentially of 10–95 percent of a co-randomized part and a balance of a non-randomized part, the co-randomized part consisting essentially of 10 to 50 percent of unhydrogenated palm oil 5 to 35 percent of lauric fats, and 10 to 50 percent of hydrogenated trans-containing fats, the non-randomized part containing fats selected from the group consisting of lauric fats, liquid oils, unhydrogenated palm oil and hydrogenated trans-containing fats such that the fat blend contains:
   18–50% saturated fatty acids with 16–24 carbon atoms;
   3–25% mono-trans unsaturated fatty acids with 16–24 carbon atoms;
   3–30 percent saturated fatty acids with 12–14 carbon atoms;
   the balance being the remaining fatty acids.

2. Fat blend according to claim 1 containing 10–45% of mono-trans unsaturated fatty acids with 16–24 carbon atoms and saturated fatty acids with 12–14 carbon atoms and no more than 60% of saturated fatty acids with 16–24 carbon atoms and mono-trans unsaturated fatty acids with 16–24 carbon atoms.

3. Fat blend according to claim 1 in which the co-randomized part is from 35–85% by weight, the remainder being the non-randomized part.

4. Fat blend according to claim 3 comprising a minor proportion of the non-randomized and a major proportion of the co-randomized part.

5. Fat blend according to claim 1 in which the percentage of palm-based fats in the co-randomized part is 15 to 45% by weight.

6. Fat blend according to claim 1 in which the non-randomized part comprises 0 to 25% of lauric fats, 0 to 50% of liquid oils, 0 to 25% palm-based fats and 0 to 35% trans-containing fats.

7. Fat blend according to claim 1 in which high trans-containing fats are used of a trans-content of 50 to 70%.

8. A margarine fat according to claim 1 which is suitable for refrigerator-type margarines, and having dilatation values at 10°C of no more than 700 and at 35°C of no more than 50, comprising 45 to 70% by weight of co-randomized constituents, the remainder being non-randomized constituents, the co-randomized part comprising 20–45% of unhydrogenated palm oil, 5–30% of lauric fats, the balance being hydrogenated trans-containing fats.

* * * * *

UNITED STATES PATENT OFFICE
CERTIFICATE OF CORRECTION

Patent No. 3,949,105               Dated April 6, 1976

Inventor(s)    Theophil Wieske et al.

It is certified that error appears in the above-identified patent and that said Letters Patent are hereby corrected as shown below:

Column 9, Line 1 of continued Examples, change column headings which now read: "Non-randomized constituents I II III IV V VI VII VIII IX X XI" to read --Total fat blend   XII   XIII   XIV   XV   XVI   XVII   XVIII   XIX   XX   XXI   XXII--.

Column 9, Line 2 of continued Examples, insert --% Fatty acids-- above line starting with the letter "H".

Columns 7 and 8, last two lines "Total fat blend XII XIII XV XVI XVIII XIX   XX XXI XXII % fatty acids" should be deleted.

Signed and Sealed this

Fifteenth Day of February 1977

[SEAL]

Attest:

RUTH C. MASON  
*Attesting Officer*

C. MARSHALL DANN  
*Commissioner of Patents and Trademarks*